United States Patent
Eaton, Jr. et al.

[11] Patent Number: 5,818,353
[45] Date of Patent: Oct. 6, 1998

[54] SELF LEVELING SENSOR/DEVICE PACKAGE

[75] Inventors: Wilbur W. Eaton, Jr., Placentia; James W. Casalegno; Kirk Kohnen, both of Fullerton; Eric K. Slater, Long Beach, all of Calif.

[73] Assignee: Hughes Aircraft Company, Los Angeles, Calif.

[21] Appl. No.: 639,230

[22] Filed: Apr. 29, 1996

[51] Int. Cl.$^6$ .................................................. G08C 19/16
[52] U.S. Cl. ............................... 340/870.01; 340/870.07; 248/638; 74/5.5
[58] Field of Search ................... 340/870.01, 870.07, 340/870.1, 870.3, 870.39; 248/179.1, 180.1, 182.1, 183.1, 550, 638; 74/5 R, 5.1, 5.5

[56] References Cited

U.S. PATENT DOCUMENTS

| | | | |
|---|---|---|---|
| 4,520,973 | 6/1985 | Clark et al. | 244/3.16 |
| 4,854,703 | 8/1989 | Ammann | 356/248 |
| 5,368,271 | 11/1994 | Kiunke et al. | 248/638 |
| 5,419,212 | 5/1995 | Smith | 74/5.1 |

*Primary Examiner*—Jeffery Hofsass
*Assistant Examiner*—Andrew Hill
*Attorney, Agent, or Firm*—G. S. Grunebach; M. W. Sales; W. K. Denson-Low

[57] ABSTRACT

Self leveling apparatus that includes a frame, a device that is to be leveled, and a leveling mechanism such as a double ring gimbal having an inner gimbal ring and an outer gimbal ring. The outer gimbal ring is secured to the frame and the inner gimbal ring is secured to the device and to the outer ring. The inner ring comprises a viscous or preloaded bearing that allows the device to swing around an inner ring axle to thereby level itself in that axis and prevent spurious movement of the device. The outer gimbal ring and inner gimbal ring are attached by outer axles that comprise a viscous or preloaded bearing that allow the inner gimbal ring to swing around the outer axles thereby level the inner gimbal ring in that axis and prevent spurious movement of the device. A disclosed embodiment of the invention includes a magnetometer sensor that is coupled to signal processing and telemetry electronics and a power source that are leveled to keep axes of the sensor oriented along horizontal and vertical axes.

9 Claims, 3 Drawing Sheets

SELF LEVELING SENSOR/DEVICE PACKAGE

BACKGROUND

The present invention relates generally to packaging, and more particularly, to a packaging approach that ensures that a sensor or other physical device achieves and maintains a level orientation.

One of the issues in deploying a three-axis magnetometer is the survey and installation to ensure that the sensor is level or that the misalignment is understood. Current state of the art techniques survey the deployment area to ensure that the sensor package is level after deployment and/or employ tilt meters in the sensor package to determine the misalignment. Both conventional techniques are expensive approaches in both hardware/software and/or time costs.

As an example of present art, three axis magnetometer alignment may be determined after deployment by using tilt meters in the sensor package. This was done on the Magnetic Array System (MARS) by personnel at the National Research Laboratory (NRL). Once the sensors were deployed, the tilt readings were used to perform a mathematical rotation on the sensed magnetometer data to ensure proper alignment with an Earth based coordinate system. The disadvantage of this approach is the increased processing load to mathematically compensate for the tilt readings, and the hardware expense of the tilt meters and their associated telemetry.

During the Roving Sands Military War Games of May 1995 in New Mexico, installation of a ten magnetometer system using manual leveling required a four person crew and 48 man hours to complete. It was estimated that 8 to 16 man-hours of labor was required to level the sensors.

Accordingly, it is an objective of the present invention to provide for an improved packaging approach that ensures that a sensor or other physical device maintains a level orientation that does not require mathematical processing to compensate for the tilt readings, and does not require tilt meters and their associated telemetry to determine the sensor orientation.

SUMMARY OF THE INVENTION

To meet the above and other objectives, the present invention provides for a self leveling sensor or device package that ensures that data derived from a sensor or device is error free relative to horizontal leveling misalignment influences. More specifically, the present invention comprises a self leveling package that includes a frame, a device that is to be leveled, and a leveling mechanism (a double ring gimbal is shown for clarity as an example that comprises an inner gimbal ring and an outer gimbal ring). In the example shown, the outer gimbal ring is secured to the frame and the inner gimbal ring is secured to the device and to the outer ring. The inner ring comprises a viscous or preloaded bearing that allows the device to swing around an inner ring axle to thereby level itself in that axis and prevent spurious movement of the device. The outer gimbal ring and inner gimbal ring are attached by outer axles that comprise a viscous or preloaded bearing that allow the inner gimbal ring to swing around the outer axles thereby level the inner gimbal ring in that axis and prevent spurious movement of the device. Other mechanisms, such as a rigid plumb bob with viscous mounting can achieve the same effect of leveling the sensor.

The present invention may be used with many devices or sensors, including magnetic, electric field, and two or three dimensional acoustic arrays. It can also be used with many electronic devices that require level orientation during operation. The present invention improves system performance and reduces processing loads incurred when a sensor or electronic device is deployed and vertical orientation is either unknown or mathematical alignment compensation is typically performed. The present disclosure focuses on one application of the present invention, namely self leveling of a three axis magnetometer sensor.

When a multi-axis magnetometer sensor is deployed, for example, it is important that the vertical axis is not tilted and that the horizontal axes are level when the sensor is in its deployed state. If the sensor is deployed with alignment errors, mathematical compensation is included in the signal processing to ensure the relationship between the axis readings is correct. The self leveling sensor and device package of the present invention eliminates the need for either extensive survey and manual leveling or the use of tilt meters by using a damped double gimbal that supports the sensor/device and (optionally) the electronics. The present mentioned package may be deployed quickly and without concern of horizontal leveling or vertical alignment. The gimbals allow the sensor or device contained therein to self-level after deployment, provided the package is emplaced in a semi-upright configuration.

The present invention may also be employed in a sensor package that is intended to be air dropped, where hand leveling cannot be performed during emplacement. The use of the present self leveling package eliminates the need to perform a mathematical rotation of the magnetometer data to align to an Earth based coordinate system. In addition to the magnetometers, sensor packages may also incorporate acoustic, seismic, chemical, or environmental sensors. These may also require leveling to ensure proper functioning. In this case, the entire sensor package may be deployed on a single self leveling device.

Other uses of the present invention include sensor packages for the U.S. Border Patrol and for the Intelligent Highways Vehicle System. The border patrol application is designed to use sensors that are distributed near infiltration points along the U.S. Canadian border and U.S. Mexican Border. For the Intelligent Highways Vehicle System, the sensor packages would be designed for use along highways and freeways to monitor traffic and report traffic conditions.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
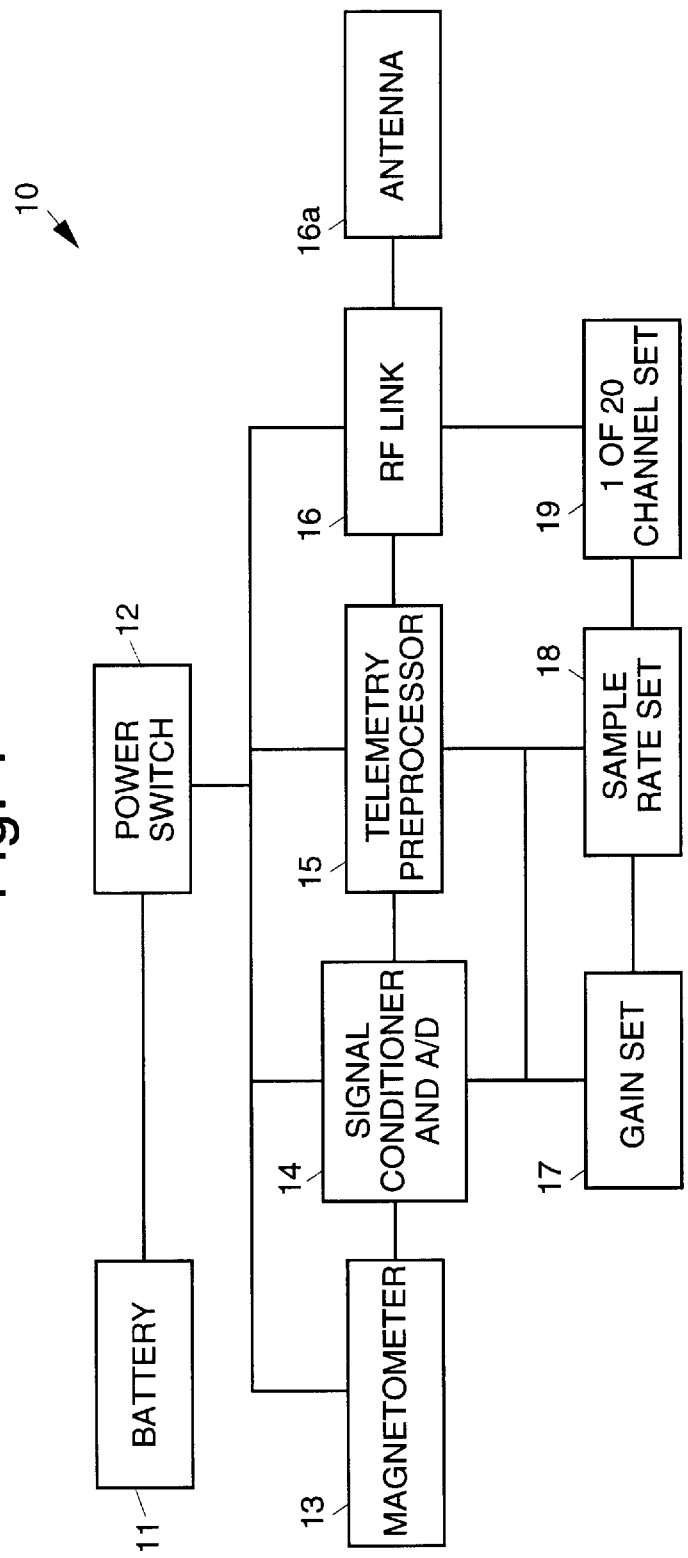
FIG. 1 illustrates a system block diagram of a self leveling sensor or device package in accordance with the principles of the present invention.

Referring to the drawing figures, FIG. 1 illustrates a system block diagram of a self leveling sensor or device package in accordance with the principles of the present invention. This description focuses on an application of the present invention that is used in conjunction with a three axis magnetometer sensor 13. However, it is to be understood that the present invention may be employed with other sensors and electronics devices, such as those mentioned above.

The self leveling package 10 comprises a power source 11 or battery 11 that is coupled by way of a power switch 12 to electronic components of the system. The electronic components of the self leveling package 10 include a sensor 13 or other physical device 13, such as a magnetometer sensor (MAG) 13, for example, an RF link 16 or communications link (COMM) 16 that includes an antenna 16a for communicating with a remote processor (not shown), a telemetry preprocessor (TEL PRE PROC) 15, and a signal conditioner and analog to digital converter (SC & A/D) 14 coupled between the magnetometer sensor 13 and the telemetry processor 15. A plurality of switching devices is provided which include an on/off switch 12, a gain control switch 19, a sample rate set switch 18, and a 1 of 20 channel set switch 17 interconnected to the various components as shown.

Figure 2:
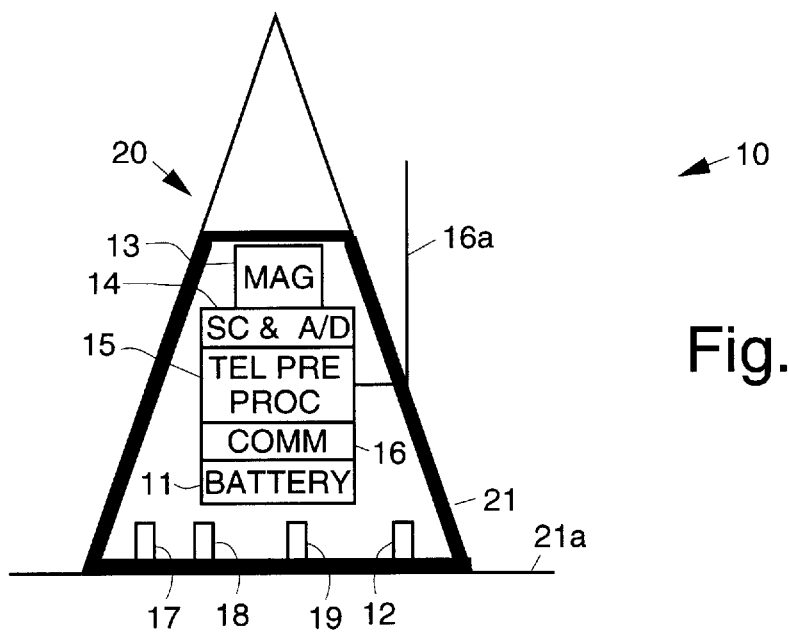
FIG. 2 illustrates a cross sectional view of the self leveling sensor or device package of the principles of the present invention.
Figure 3:
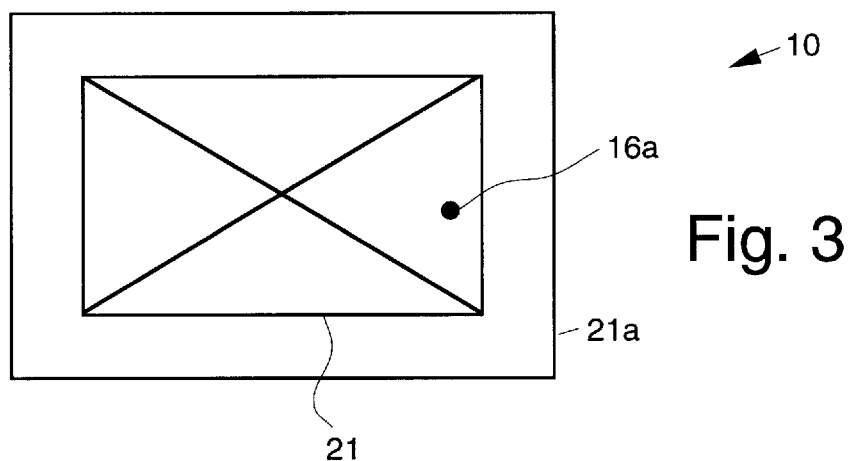
FIG. 3 illustrates a top view of the self leveling sensor or device package of FIG. 2.

FIGS. 2 and 3 illustrate cross sectional and top views, respectively, of the self leveling package 10 illustrating the physical arrangement of the components thereof. The self leveling package 10 ensures that the sensor 13 or other physical device 13, attached thereto maintains a level orientation. The self leveling package 10 shown in FIG. 2 comprises a frame 21, or stand 21 having a base 21a, that supports the deployed package 10. More specifically, the frame 21 supports the magnetometer sensor (MAG) 13, power source 11, communications link (COMM) 16, telemetry preprocessor (TEL PRE PROC) 15, and signal conditioner and analog to digital converter (SC & A/D) 14. The frame 21 or stand 21 has a pyramid shape with a flat base 21a. The relative locations of the plurality of switching devices is shown, which may be disposed on the base 21a. The frame 21 secures a double ring gimbal 20 that is used to hold the components and level the components relative to horizontal and vertical axes.

Figure 4:
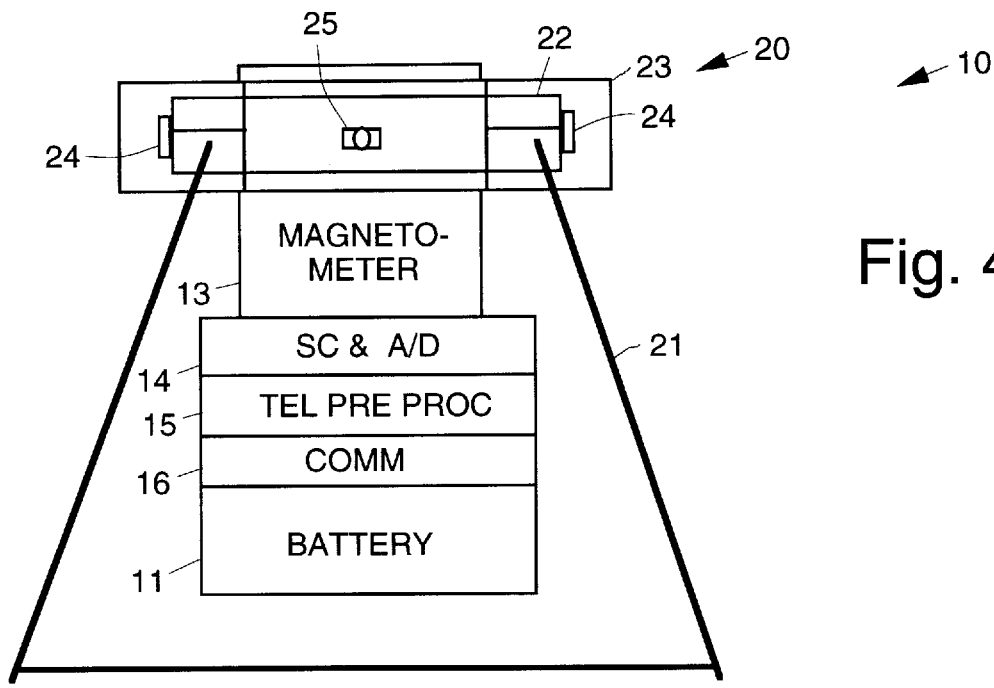
FIG. 4 illustrates a side view of a double ring gimbal employed in the package of FIG. 2.
Figure 5:
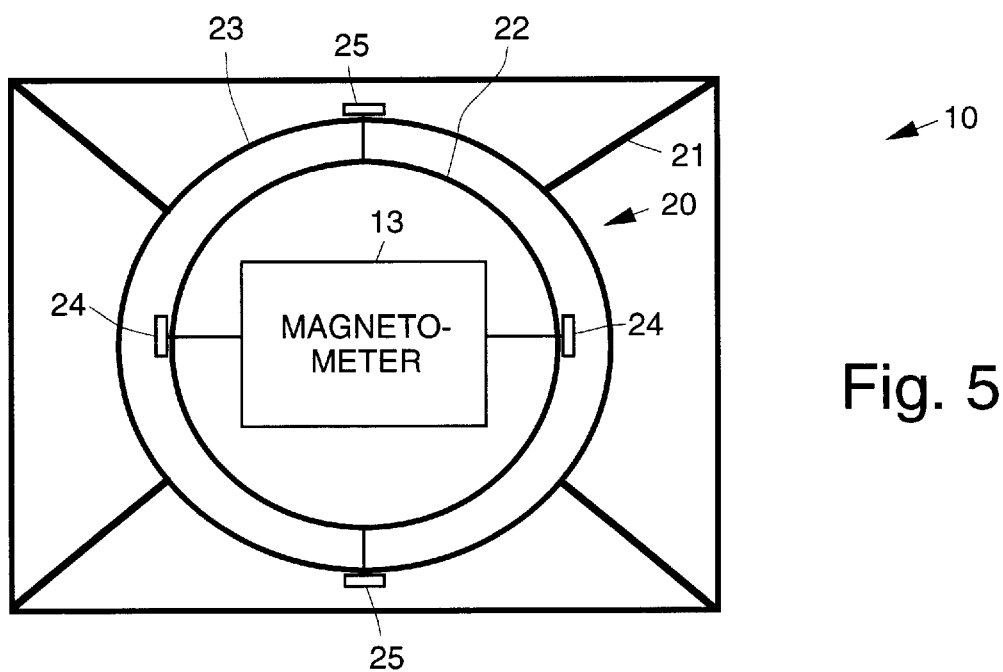
FIG. 5 illustrates a top view of the double ring gimbal employed in the package of FIG. 2.

Referring to FIGS. 4 and 5, they show side and top views of the self leveling package 10 that illustrate details of the double ring gimbal 20 employed in the package 10 of FIG. 2. The double ring gimbal 20 comprises inner and outer gimbal rings 22, 23. The outer gimbal ring 23 is secured to the housing 21 while the inner gimbal ring 22 is secured to the magnetometer 13 and to the outer ring 23. The inner and outer gimbal rings 22, 23. The inner gimbal ring 22 attaches directly to the magnetometer sensor 13 and to the outer gimbal ring 23. The inner ring 22 attachment to the magnetometer sensor 13 comprises a viscous or preloaded bearing 24 that allows the magnetometer sensor 13 to swing around an inner ring axle 26, thereby leveling itself in that axis and preventing spurious movement. The outer gimbal ring 23 and inner gimbal ring 22 are attached by outer axles 27 that comprise a viscous or preloaded bearing 27 that allow the inner gimbal ring 22 to swing around the outer axles 27 thereby leveling the inner gimbal ring 22 in that axis and preventing spurious movement.

The double gimbaled self leveling system 10 provided by the self leveling package 10 has a mechanical design that maintains vertical axis alignment with the earth's gravitational pull and levels the horizontal axis of the sensor 13 perpendicular to the vertical axis of the sensor 13. The viscous or preloaded bearings 26, 27 prevent oscillation of the sensor 13 after deployment, in that enough friction is present to dampen spurious movement and at the same time allow the sensor 13 and electronic components to seek a level position. The frame 21 is attached to the outer gimbal ring 23 and supports the deployed package 10. The base 21a of the frame 21 or stand 21 is wide in comparison to the top portion of the frame 21 so that a pyramid shape is formed. This is a stable design that is less susceptible to wind, ocean current, or vehicle vibration, and the like, after deployment. In the packaging concept for the three axis magnetometer sensor 13 shown in FIGS. 2 and 3, the weight of the magnetometer sensor 13, telemetry preprocessor 15, and communication electronics (communications link 16 and signal conditioner and analog to digital converter 14) combined with the weight of the battery 11 allows the double gimbal 20 to align the sensor 13 to level.

Thus, an improved packaging approach that ensures that a sensor or other physical device maintains a level orientation and that does not require mathematical processing to compensate for the tilt readings has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A self leveling package comprising:
   a frame;
   a device that is to be leveled;
   a leveling mechanism comprising a double ring gimbal comprising an inner gimbal ring and an outer gimbal ring, and wherein the outer gimbal ring is secured to the frame and the inner gimbal ring is secured to the device and to the outer ring, and wherein the inner ring comprises a viscous or preloaded bearing that allows the device to swing around an inner ring axle to thereby level itself in that axis and prevent spurious movement of the device, and wherein the outer gimbal ring and inner gimbal ring are attached by outer axles that comprise a viscous or preloaded bearing that allow the inner gimbal ring to swing around the outer axles thereby level the inner gimbal ring in that axis and prevent spurious movement of the device.

2. The package magnetometer of claim 1 further comprising:
   a communications link having an antenna for communicating with a remote processor;
   a signal conditioner and analog to digital converter coupled between the device and the communications link;
   a telemetry preprocessor coupled between the signal conditioner and analog to digital converter and the communications link; and
   a power source for providing power to the communications link, the signal conditioner and analog to digital converter and the telemetry preprocessor.

3. The package of claim 2 wherein the communications link, the signal conditioner and analog to digital converter, the telemetry preprocessor and the power source are attached to the device.

4. The package of claim 2 further comprising a plurality of switching devices comprising an on/off switch, a gain control switch, a sample rate set switch, and a channel set switch interconnected to the communications link, the signal conditioner and analog to digital converter, the telemetry preprocessor.

5. The package of claim 1 wherein the device comprises a magnetometer sensor.

6. A self leveling package for leveling a sensor, said package comprising:

a frame;

a sensor that is to be leveled;

a double ring gimbal comprising an inner gimbal ring and an outer gimbal ring, and wherein the outer gimbal ring is secured to the frame and the inner gimbal ring is secured to the sensor and to the outer ring, and wherein the inner ring comprises a viscous or preloaded bearing that allows the sensor to swing around an inner ring axle to thereby level itself in that axis and prevent spurious movement of the sensor, and wherein the outer gimbal ring and inner gimbal ring are attached by outer axles that comprise a viscous or preloaded bearing that allow the inner gimbal ring to swing around the outer axles thereby level the inner gimbal ring in that axis and prevent spurious movement of the sensor;

a communications link having an antenna for communicating with a remote processor;

a signal conditioner and analog to digital converter coupled between the sensor and the communications link;

a telemetry preprocessor coupled between the signal conditioner and analog to digital converter and the communications link; and a power source for providing power to the communications link, the signal conditioner and analog to digital converter and the telemetry preprocessor.

7. The package of claim 6 wherein the sensor comprises a magnetometer sensor.

8. The package of claim 6 wherein the communications link, the signal conditioner and analog to digital converter, the telemetry preprocessor and the power source are attached to the sensor.

9. The package of claim 6 further comprising a plurality of switching devices comprising an on/off witch, a gain control switch, a sample rate set switch, and a channel set switch interconnected to the communications link, the signal conditioner and analog to digital converter, the telemetry preprocessor.

* * * * *